Dec. 2, 1969  H. E. RIORDAN  3,482,129
INDUCTOR GENERATOR WITH SELF-LUBRICATING BEARING AND
CONSTANT AIR GAPS FOR SENSING VEHICLE WHEEL SPEED
Filed July 25, 1968
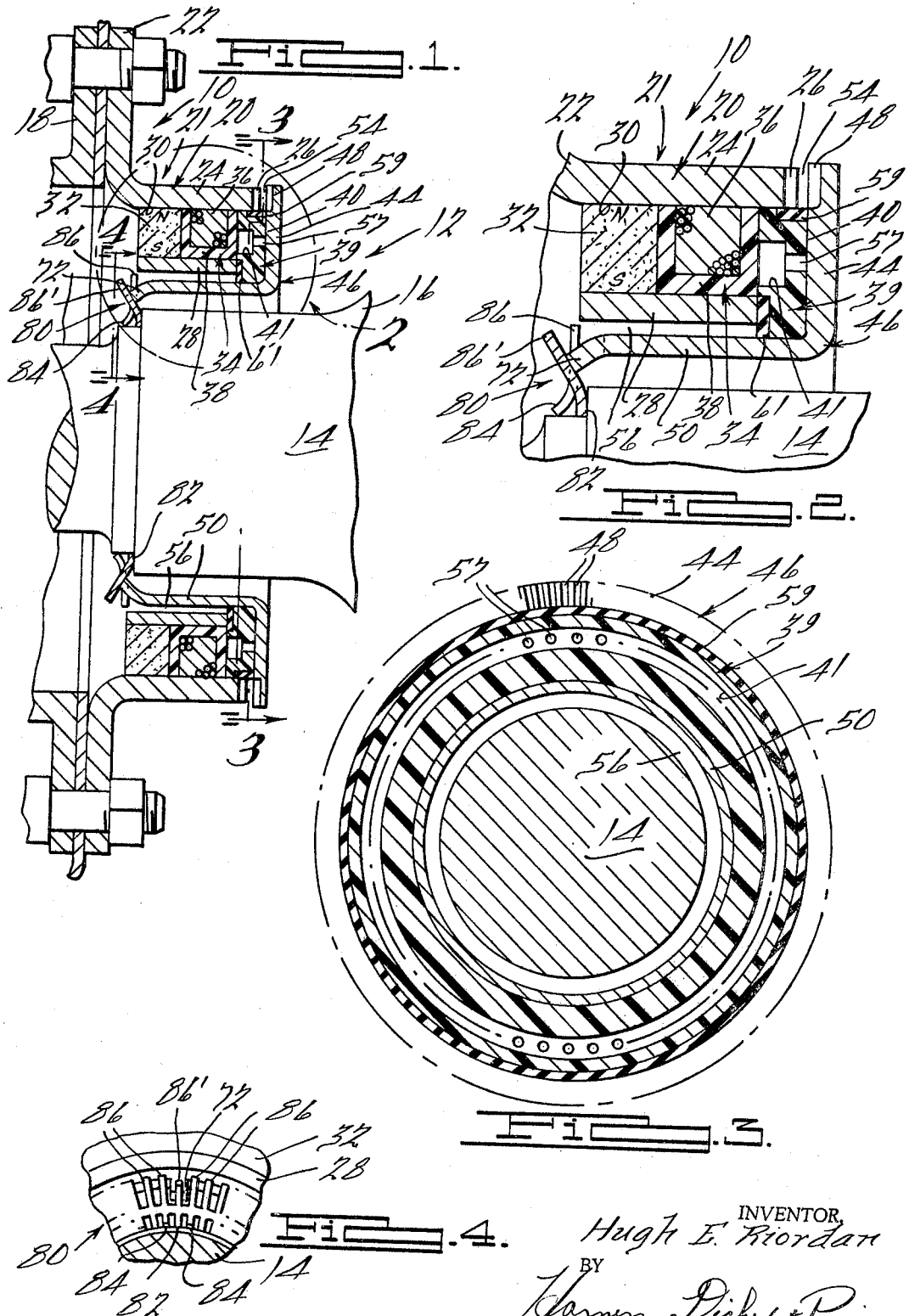
INVENTOR,
Hugh E. Riordan
BY
Harness, Dickey & Pierce
ATTORNEYS.

United States Patent Office 3,482,129
Patented Dec. 2, 1969

3,482,129
INDUCTOR GENERATOR WITH SELF-LUBRICATING BEARING AND CONSTANT AIR GAPS FOR SENSING VEHICLE WHEEL SPEED
Hugh E. Riordan, Wyckoff, N.J., assignor to Kelsey-Hayes Company, Romulus, Mich., a corporation of Delaware
Filed July 25, 1968, Ser. No. 747,508
Int. Cl. H02k 7/08
U.S. Cl. 310—67                                    6 Claims

ABSTRACT OF THE DISCLOSURE

An inductor generator having an annular permanent magnet and output coil on a stator fixed to a vehicle axle housing, and having an outside rotor flexibly coupled to the axle. The reluctance is varied by confronting rotor and stator teeth. Between the rotor and stator a bearing ring with oil cavity and seals is provided for self-lubrication and for maintaining, together with the flexible coupling, constant air gaps regardless of axial and radial deflections of the axle.

Summary background of the invention

The present invention relates to electrical speed sensors.

In sensing rotational speed specifically at the rear wheels of a vehicle, a desirable location for the sensor is between the axle shaft flange and axle housing of the rear wheel. However, it has been found that under severe load conditions the rear axle shaft undergoes substantial radial deflection relative to the housing. With a sensor construction having a pair of relatively rotatable pole members, one being fixed to the axle housing and the other being fixed to rotate with the axle shaft, it has been found that the extreme radial and/or axial deflections under severe load of the axle shaft cause substantial variation in the air gap between the sensor pole members and in some cases could cause the two members to engage resulting in damage to the sensor. The problem of engagement can be avoided by providing a sufficiently large air gap or spacing between the two sensor pole members such that even under the most extreme load conditions of the axle shaft such engagement would not occur. However, with such a construction a relatively wide air gap would be required reducing the efficiency of the sensor. In the present invention the rotor is supported for rotation on the stator and a separate coupling is used whereby the rotor is turned with the axle shaft. With such a construction the air gap is maintained at a minimum; however, in mounting the rotor to the stator a bearing surface on the rotor engages a mating bearing surface on the stator. It is desirable that these surfaces be lubricated. Therefore it is an object of the present invention to provide a sensor of the above described type having means for self-lubrication.

It is another object of the present invention to provide an improved sensor construction for sensing relative rotation between two relatively rotating members.

It is another object of the present invenion to provide a new and improved sensor construction of the above described type in which the sensing rings or poles are secured such that a substantially constant air gap is maintained with the rotor ring supported for rotation on the stator ring and including means for self-lubrication.

Other objects, features, and advantages of the present invention will become apparent from the subsequent description and the appended claims, taken in conjunction with the accompanying drawings, in which:

FIGURE 1 is a elevational view with some parts shown in section and others broken away of a sensor assembly embodying features of the present invention;

FIGURE 2 is a view to increased scale of that portion of FIGURE 1 enclosed by the circle 2;

FIGURE 3 is a sectional view of the sensor assembly of FIGURE 1 taken generally along the lines 3—3, and FIGURE 4 is a sectional view of the sensor assembly of FIGURE 1 taken generally along the lines 4—4.

Looking now to the FIGURES 1 and 2 of the drawing, the sensor assembly is generally indicated by the numeral 10 and is shown in assembly relationship with a rear axle assembly 12 which rear axle assembly includes an axle shaft 14 which terminates at its outer end in a flange 16 to which a wheel assembly (not shown) can be mounted. The axle shaft 14 is rotatably mounted within an axle housing assembly 18 to which at least a portion of the sensor assembly 10 is mounted.

The sensor has a stator assembly 21 including a stator or fixed pole member 20 which is secured to the axle housing 18 through a radially extending flange 22. The stator 20 has an axially extending annular portion 24 terminating in a plurality of generally uniformly circumferentially disposed, radially extending teeth 26. The axially extending portion 24 along with an annular ring 28 defines an annular cavity 30 in which are located a permanent magnet 32 and a coil assembly 34. The permanent magnet 32 is preferably of an annular ring construction having a polarity as indicated in FIGURE 1. The coil assembly 34 also extends annularly within the opening 30 and includes an electrical coil 36 which is wound in a plastic bobbin 38. An annular bearing ring 39 is located at the forward end of the cavity 30 and has an annular groove 41 in its rearward face which with the bobbin 38 defines an annular cavity; the ring 39 extends radially inwardly beyond the radially inner surface of the ring 28. The bearing ring 39 can be constructed of a material having good bearing characteristics such as Teflon. The forward face 40 of the ring 39 extends beyond the axial extremity of the teeth 26 and also beyond the axial outer extremity of the ring 28 and engages a radially extending flange 44 of an armature or rotor member 46. The rotor or pole member 46 is generally of an L-shaped cross section and has a plurality of uniformly circumferentially disposed radially extending teeth 48 on flange 44 which are located in axial confrontation with the teeth 26. The armature 46 has an axially extending tubular portion 50 which extends for a substantial axial distance radially spaced from and in confrontation with ring 28. With the assembly as shown and described thus far a first air gap 54 is defined between the teeth 26 and 48 and second air gap 56 is defined between the tubular portion 50 of armature 46 and the ring 28. Since the tubular portion 50 extends for a substantial distance in confrontation with ring 28 the reluctance of the air gap 56 is minimized. Note that in supporting the armature or rotor 46 for rotation the bearing ring 39 also engages a part of the tubular portion 50. In order to minimize wear the bearing surfaces between rotor 46 and bearing ring 39 are lubricated via lubricant in pocket 41; a plurality of openings 57 permit the flow of lubricant to the bearing surfaces while a pair of annular seals 59 and 61 prevent escape of the lubricant. Hence a construction is shown which is self lubricating.

The armature 46 is provided with a plurality of generally axially extending finger portions 72. A drive ring 80 is made of a flexible material having a plurality of radially inwardly extending fingers 82 and 84 at its radially inner end which will grip the axle shaft 14 such that the rotation of the axle shaft 14 will result in rotation of the flexible drive ring 80. The drive member 80 also has a plurality of radially outwardly extending fingers 86 at its outer periphery. In assembly, armature finger portions 72 will engage spaced fingers 86' of the fingers 86 depressing them radially inwardly as shown whereby a driving connection will be provided by two circumferentially, adjacent fingers 86; since the engagement between the drive member 80 and the armature 46 is by way of fingers 86 any relative axial and radial movement will be accommodated by flexing of the engaging ones of the fingers 84 whereby the widths of air gap 54 and 56 can be made constant.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An electrical rotational speed sensor for providing an electrical signal indicative of the rotational speed between a pair of members with one of the members supported for rotation relative to the other, the sensor comprising: a rotor connected to the one of the members for rotation therewith, a stator connected to the other of the members, a first support surface on said rotor, a second support surface on said stator for rotatably supporting said rotor on said first support surface, and means connected with one of said rotor and said stator for communicating with said first and second surfaces and for providing lubricant thereto.

2. The sensor of claim 1 with said means including an annular bearing ring defining one of said surfaces and having a cavity for carrying lubricant.

3. The sensor of claim 2 with said stator including said means.

4. The sensor of claim 3 with said rotor including a first tubular portion having a radial flange at one end with a first plurality of circumferentially distributed, radially extending teeth, said stator having a second tubular portion with a second plurality of circumferentially distributed, radially extending teeth located in confrontation with said first plurality of teeth, said stator including a tubular support ring spaced from said first tubular portion, a magnet and a coil located between and supported by said support ring and said second tubular portion, said first tubular portion and said support ring extending axially coextensively for a substantial distance whereby the reluctance therebetween is minimized.

5. The sensor of claim 4 with said bearing ring located between said first and second tubular portions for supporting said rotor for rotation relative to said stator.

6. The sensor of claim 5 including a drive ring supported on the one of the members for rotation therewith and coupling means for rotatably coupling said drive ring and said rotor for rotation by the one of the members, said coupling means permitting relative movement in one of axial and radial directions between the members substantially without coresponding relative movement between said rotor and said stator.

References Cited

UNITED STATES PATENTS

| | | | |
|---|---|---|---|
| 2,824,245 | 2/1958 | Trevitt | 310—168 |
| 3,191,079 | 6/1965 | Gitzendanner | 310—90 X |
| 3,193,713 | 7/1965 | Larson et al. | 310—168 |
| 3,383,533 | 5/1968 | Jarret et al. | 310—168 |

FOREIGN PATENTS 1,336,035   7/1963   France.

WARREN E. RAY, Primary Examiner

U.S. Cl. X.R.

310—75, 90, 154, 168, 181